(12) United States Patent
Alba et al.

(10) Patent No.: US 11,406,918 B2
(45) Date of Patent: Aug. 9, 2022

(54) ADJUSTABLE PARTICLE SEPARATOR SYSTEM AND METHOD OF USING SAME

(71) Applicant: University of Houston System, Houston, TX (US)

(72) Inventors: Kamran Alba, Houston, TX (US); Nima Mirzaeian, Houston, TX (US); Venkatesh Balan, Sugar Land, TX (US)

(73) Assignee: University of Houston System, Houston, TX (US)

( * ) Notice: Subject to any disclaimer, the term of this patent is extended or adjusted under 35 U.S.C. 154(b) by 0 days.

(21) Appl. No.: 17/052,052

(22) PCT Filed: Apr. 30, 2019

(86) PCT No.: PCT/US2019/030010
§ 371 (c)(1),
(2) Date: Oct. 30, 2020

(87) PCT Pub. No.: WO2019/213141
PCT Pub. Date: Nov. 7, 2019

(65) Prior Publication Data
US 2021/0245075 A1   Aug. 12, 2021

Related U.S. Application Data

(60) Provisional application No. 62/664,786, filed on Apr. 30, 2018.

(51) Int. Cl.
*B01D 21/02* (2006.01)
*B01D 21/00* (2006.01)
(Continued)

(52) U.S. Cl.
CPC ..... *B01D 21/0009* (2013.01); *B01D 21/0045* (2013.01); *B01D 21/0072* (2013.01);
(Continued)

(58) Field of Classification Search
CPC ............ B01D 21/0009; B01D 21/0015; B01D 21/0045; B01D 21/0072; B01D 17/0211; B01D 17/06; C02F 1/463
(Continued)

(56) References Cited

U.S. PATENT DOCUMENTS

| 823,671 A | 6/1906 | Dieterich | |
|---|---|---|---|
| 2,973,866 A * | 3/1961 | Genter | B01D 21/0045 210/524 |

(Continued)

OTHER PUBLICATIONS

Boycott, A. E. "Sedimentation of blood corpuscles," Nature 104. 2621-1920: p. 532.
(Continued)

*Primary Examiner* — Christopher Upton
(74) *Attorney, Agent, or Firm* — Blank Rome LLP; Matthew J. Esserman

(57) ABSTRACT

An adjustable separation system for separating particles suspended in a liquid and method of using same are disclosed. Embodiments are directed to an adjustable separation system that includes an adjustable particle separation channel including: a plurality of plate electrodes; and an adjustable inclination system configured to adjust inclination of the plate electrodes through a range of angles, or an adjustable spacing system configured to adjust spacing between adjacent plate electrodes. The adjustable separation system allows the particle-laden liquid to traverse the plate electrodes within the separation channel, thereby separating the particles from the liquid while using the Boycott effect. These and other embodiments achieve separation of particles suspended in a liquid via an adjustable separation system and, optionally, without the need for manual/technician adjustments, which can result in improved efficiency, quicker separation/operating time, and reduced power consumption and cost.

10 Claims, 4 Drawing Sheets

(51) Int. Cl.
*B03D 1/14* (2006.01)
*C02F 1/463* (2006.01)

(52) U.S. Cl.
CPC ......... *B03D 1/1437* (2013.01); *B03D 1/1481* (2013.01); *C02F 1/463* (2013.01)

(58) Field of Classification Search
USPC .................. 210/748.01, 802, 243, 521, 522
See application file for complete search history.

(56) References Cited

U.S. PATENT DOCUMENTS

| | | | | |
|---|---|---|---|---|
| 4,469,582 A | * | 9/1984 | Sublette | ................ C10G 33/02 210/521 |
| 4,889,624 A | | 12/1989 | Soriente et al. | |
| 4,908,109 A | * | 3/1990 | Wright | .................... C02F 1/465 210/748.01 |
| 4,919,777 A | * | 4/1990 | Bull | ....................... B01D 17/06 210/774 |
| 4,957,628 A | * | 9/1990 | Schulz | ............... B01D 21/0072 210/521 |
| 5,013,435 A | | 5/1991 | Rider et al. | |
| 5,049,278 A | | 9/1991 | Galper | |
| 6,315,898 B1 | * | 11/2001 | Bull | ................... B01D 17/0211 210/521 |
| 7,201,849 B2 | * | 4/2007 | Boulant | ............ B01D 21/0045 210/802 |
| 8,430,996 B2 | * | 4/2013 | Kaspar | ................... C02F 1/463 210/748.01 |
| 9,822,022 B2 | | 11/2017 | Ge | |
| 2009/0032448 A1 | | 2/2009 | Kolb | |
| 2010/0252447 A1 | | 10/2010 | Powell | |
| 2014/0151300 A1 | | 6/2014 | Savage et al. | |
| 2016/0008746 A1 | | 1/2016 | Zhou | |

OTHER PUBLICATIONS

Eslami, et al., "Non-isothermal buoyancy-driven exchange flows in inclined pipes," Physics of Fluids 29, 062108, Jun. 22, 2017, 17 pages.

Ibanez, et. al., "Laboratory Experiments on Electrochemical Remediation of the Environment: Electrocoagulation of Oily Wastewater," Journal of Chemical Education, vol. 72, No. 11, Nov. 1995, pp. 1050-1052.

Jiang, et al., :Dynamic experimental study of a new electrocoagulation apparatus with settlement scheme for the removal process in oilfield, Journal of Electroanalytical Chemistry 801 (2017) pp. 14-21.

Mirzaeian, et al., "Bidensity particle-laden exchange flows in a vertical duct," J. Fluid Mech. 891 (2020), 30 pages.

Mirzaeian, Nima, "Buoyancy-driven Particle-laden Exchange Flows in Inclined Conduits," A Thesis Presented to the Faculty of the Department of Engineering Technology University of Houston, May 2018, 98 pages.

Mirzaeian, N., and K. Alba, "Monodisperse particle-laden exchange flows in a vertical duct," J. Fluid Mech. 847 (2018), pp. 134-160.

Mirzaeian, Nima, and Kamran Alba, "Particle-laden exchange flows in inclined pipes," Physical Review Fluids 3, 114301, Nov. 15, 2018, 24 pages.

International Search Report and Written Opinion received in International Application No. PCT/US2019/030010, dated Jul. 9, 2019, 9 pages.

Singh, et al., "Laboratory Experiments on Electrochemical Remediation of the Environment. Part 4: Color Removal of Simulated Wastewater by Electrocoagulation-Electroflotation," Journal of Chemical Education, vol. 75, No. 8, Aug. 1998, pp. 1040-1041.

Sivakumar, et al., "Biorhizome: A Biosynthetic Platform for Colchicine Biomanufacturing," Frontiers in Plant Science, vol. 8, Article 1137, Jun. 30, 2017, pp. 1-9.

Vik, et al., "Electrocoagulation of Potable Water," Water Res. vol. 18, No. 11, 1984, pp. 1355-1360.

* cited by examiner

ADJUSTABLE PARTICLE SEPARATOR SYSTEM AND METHOD OF USING SAME

CROSS REFERENCE TO RELATED APPLICATION(S)

This application is a national phase of PCT/US19/30010, filed Apr. 30, 2019, which claims priority to U.S. provisional patent application No. 62/664,786, filed on Apr. 30, 2018, both of which are hereby incorporated herein by reference in their entireties.

GOVERNMENT SPONSORSHIP

None.

FIELD

The embodiments disclosed herein are in the field of separators. More particularly, the embodiments disclosed herein relate to separators and methods of using same, which, inter alia, achieve separation of particles suspended in a liquid via an adjustable separation system and, optionally, without the need for manual/technician adjustments, which can result in improved efficiency, quicker separation/operating time, simultaneous separation of multiple solid and liquid phases, and reduced power consumption and cost.

BACKGROUND

Existing separation technologies work based on either Boycott effect (lamella clarifier) or electrocoagulation only. The most recent article in this area, published by Jiang et al. titled "Dynamic experimental study of a new electrocoagulation apparatus with settlement scheme for the removal process in oilfield" in *Journal of Electroanalytical Chemistry* 801:14-21 (2017), considers a combination of electrocoagulation and a lamella clarifier at a very basic level. The duct (i.e., bar, plate, or plate electrode) angle is fixed, massively limiting the flexibilities of using the device in a wide range of suspensions. Moreover, there is no concrete data-driven analysis of the problem exploring the effects of different controlling parameters. Other competing industrial technologies for particle separation from liquid include the following devices: inline centrifugal separator, membrane filtration device, distillation device, screw press, spiral gravity separator, shaking table separator, jig-based separator, pinched sluice separator, and drum separator.

The current settler designs are fixed (i.e., no adjustable plates' spacing, angle or electric field variation). As a result, these current settling design processes are highly inefficient, have lengthy settling/operating times, and have high energy consumption and cost demands.

As a novel approach, the inventors propose a design of a versatile adjustable separation system based on Boycott effect in an embodiment, with electrocoagulation in another embodiment, and, optionally, in an automated manner using, for example, artificial intelligence. As a result, the adjustable separation system can be used for a wide range of processes including a wide range of suspensions, and, optionally, conveniently through an automated and intelligent module(s). One specific exemplary embodiment is discussed below, and is illustrated in FIG. 1.

Thus, it is desirable to provide an adjustable separation system and method of using same that are able to overcome the above disadvantages.

These and other advantages of the present invention will become more fully apparent from the detailed description of the invention herein below.

SUMMARY

Embodiments are directed to an adjustable separation system for separating particles suspended in a liquid. The adjustable separation system comprises an adjustable particle separation channel comprising: a plurality of plate electrodes; and an adjustable inclination system configured to adjust inclination of the plate electrodes through a range of angles, or an adjustable spacing system configured to adjust spacing between adjacent plate electrodes. The adjustable separation system is configured to allow the particle-laden liquid to traverse the plate electrodes within the separation channel, thereby separating the particles from the liquid while using Boycott effect.

In an embodiment, the adjustable particle separation channel comprises the adjustable inclination system.

In an embodiment, the range of angles is from 0.1°-89.9° with respect to the vertical axis.

In an embodiment, the adjustable inclination system comprises an inclination bracket operatively connected to the plate electrodes, whereby movement of the inclination bracket adjusts the inclination of the plate electrodes through the range of angles.

In an embodiment, the adjustable inclination system further comprises a tilting mechanism operatively connected to the inclination bracket, wherein the tilting mechanism effects the movement of the inclination bracket.

In an embodiment, the adjustable particle separation channel comprises the adjustable spacing system.

In an embodiment, the adjustable spacing system comprises a spacing bracket operatively connected to the plate electrodes, whereby movement of the spacing bracket adjusts the spacing between the adjacent plate electrodes.

In an embodiment, the adjustable spacing system further comprises a movement mechanism operatively connected to the spacing bracket, wherein the movement mechanism effects the movement of the spacing bracket.

In an embodiment, the separation channel is an electrocoagulation separation channel, whereby the plate electrodes are configured to be alternately voltage-biased using a voltage application system. The separation of the particles from the liquid uses a combination of electrocoagulation and the Boycott effect.

In an embodiment, the particles comprise solid material.

Embodiments are also directed to a method of using an adjustable separation system for separating particles suspended in a liquid. The method comprises: providing an adjustable particle separation channel comprising a plurality of plate electrodes, wherein the adjustable particle separation channel is part of the adjustable separation system; adjusting inclination of the plate electrodes through a range of angles using an adjustable inclination system, or adjusting spacing between adjacent plate electrodes using an adjustable spacing system; and allowing the particle-laden liquid to traverse (i.e., either upward or downward) the plate electrodes within the separation channel, thereby separating the particles from the liquid while using Boycott effect.

In an embodiment of the method, the adjustable particle separation channel comprises the adjustable inclination system, the method comprising the step of adjusting inclination.

In an embodiment of the method, the range of angles is from 0.1°-89.9° with respect to the vertical axis.

In an embodiment of the method, the adjustable inclination system comprises an inclination bracket operatively connected to the plate electrodes, wherein the adjusting the inclination of the plate electrodes through the range of angles is performed via moving the inclination bracket.

In an embodiment of the method, the adjustable inclination system further comprises a tilting mechanism operatively connected to the inclination bracket, wherein the tilting mechanism effects the movement of the inclination bracket.

In an embodiment of the method, the adjustable particle separation channel comprises the adjustable spacing system, the method comprising the step of adjusting spacing.

In an embodiment of the method, the adjustable spacing system comprises a spacing bracket operatively connected to the plate electrodes, wherein the adjusting the spacing between adjacent plate electrodes is performed via moving the spacing bracket.

In an embodiment of the method, the adjustable spacing system further comprises a movement mechanism operatively connected to the spacing bracket, wherein the movement mechanism effects the movement of the spacing bracket.

In an embodiment of the method, the separation channel is an electrocoagulation separation channel, wherein the method further comprises applying an alternately voltage-biasing to the plate electrodes using a voltage application system. The separation of the particles from the liquid uses a combination of electrocoagulation and the Boycott effect.

In an embodiment of the method, the particles comprise solid material.

BRIEF DESCRIPTION OF THE DRAWINGS

The foregoing summary, as well as the following detailed description, will be better understood when read in conjunction with the appended drawings. For the purpose of illustration only, there is shown in the drawings certain embodiments. It's understood, however, that the inventive concepts disclosed herein are not limited to the precise arrangements and instrumentalities shown in the figures.

DETAILED DESCRIPTION

Figure 1:
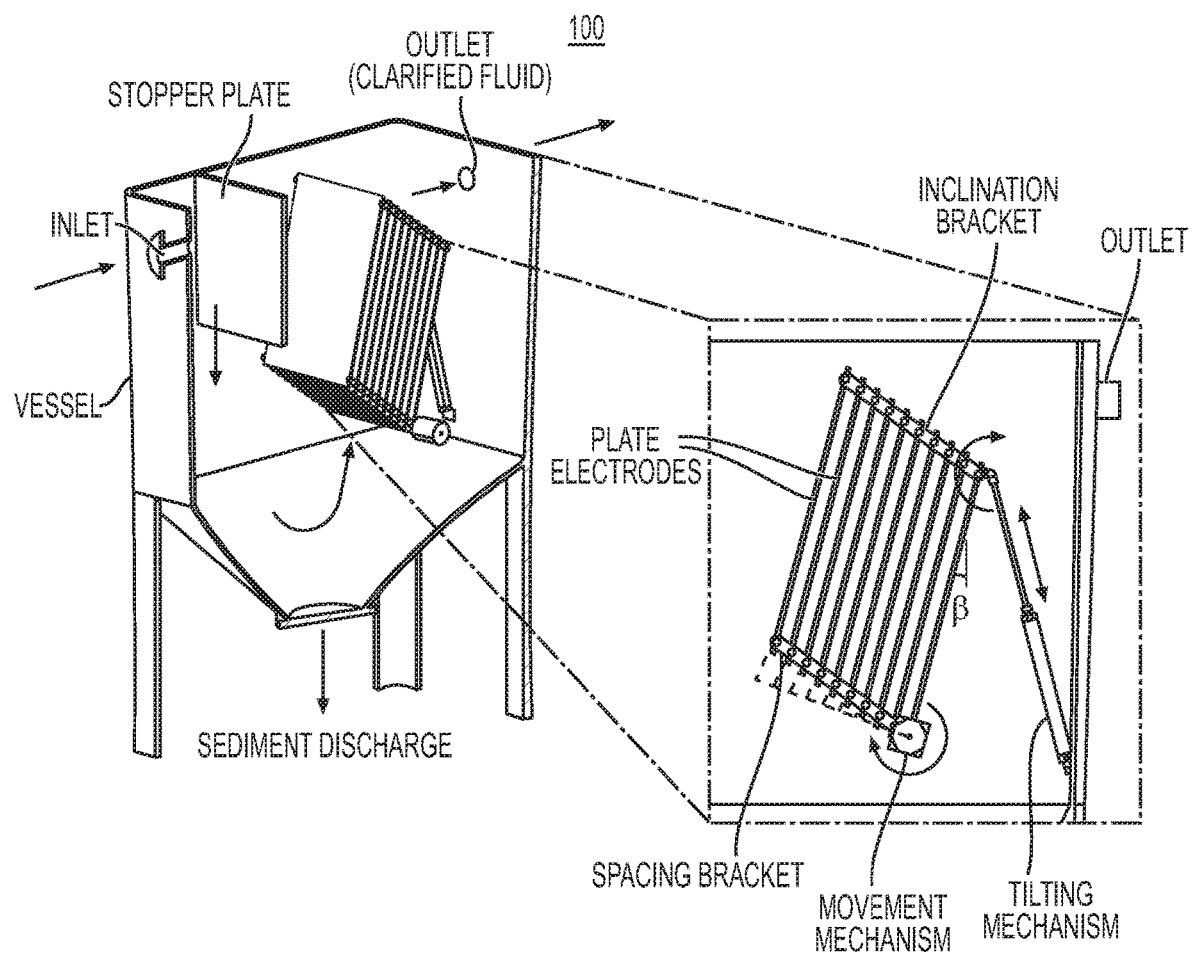
FIG. 1 is a diagram illustrating a schematic of an exemplary adjustable separation system (i.e., without electrocoagulation), in accordance with an embodiment.

It is to be understood that the figures and descriptions of the present invention may have been simplified to illustrate elements that are relevant for a clear understanding of the present embodiments, while eliminating, for purposes of clarity, other elements found in a typical separator or typical method of using a separator. Those of ordinary skill in the art will recognize that other elements may be desirable and/or required in order to implement the present embodiments. However, because such elements are well known in the art, and because they do not facilitate a better understanding of the present embodiments, a discussion of such elements is not provided herein. It is also to be understood that the drawings included herewith only provide diagrammatic representations of the presently preferred structures of the present invention and that structures falling within the scope of the present embodiments may include structures different than those shown in the drawings. Reference will now be made to the drawings wherein like structures are provided with like reference designations.

Before explaining at least one embodiment in detail, it should be understood that the concepts set forth herein are not limited in their application to the construction details or component arrangements set forth in the following description or illustrated in the drawings. It should also be understood that the phraseology and terminology employed herein are merely for descriptive purposes and should not be considered limiting.

It should further be understood that any one of the described features may be used separately or in combination with other features. Other embodiments of devices, systems, methods, features, and advantages described herein will be or become apparent to one with skill in the art upon examining the drawings and the detailed description herein. It's intended that all such additional devices, systems, methods, features, and advantages be protected by the accompanying claims.

For purposes of this disclosure, the terms "settler", "destabilizer" (in cases of, for example, suspensions such as colloids), and "separator" (and respective derivatives thereof) may be used interchangeably.

Also, for purposes of this disclosure, the terms "device", "mechanism", "apparatus", and "system" (and respective derivatives thereof) may be used interchangeably.

Further, for purposes of this disclosure, the terms "inclining", "angling", "tilting", and "pivoting" may be used interchangeably.

The Jiang et al. (2017) article referenced above is hereby incorporated herein as part of this disclosure. The following items utilized in the present disclosure may be the type utilized and described more fully in Jiang et al:
  type (size, composition, thickness, etc.), number, and spacing of the plate electrodes;
  application and technique of voltage application to the plate electrodes for electrocoagulation;
  the housing containing the plate electrodes;
  the connections or pipes to and from the housing; and
  any other items (e.g., element, method step, connections, compositions, arrangements, etc.) not mentioned specifically below.

Separation of particles from liquid phase in a suspension mixture is an ongoing challenge for a variety of industries. The particles to be removed from the liquid in any of the below-embodiments may comprise, for example, solid material, soft material (e.g., biological cells), fibers, vesicles, and/or even droplets (or other liquid material) that differs in, for example, density, viscosity, electrical properties from the remaining liquid. The liquid (or fluid) (containing the particles) in any of the below-embodiments may comprise, for example, a multiphase, homogenous, or non-homogenous mixture, a single fluid, emulsion, suspension, and/or polymer solution. Current techniques are time and energy consuming and are mostly invariable (single-purposed, fixed, unadjustable), and are therefore costly. One of the established techniques in the area of industrial settlers is suspension settling within an inclined duct based on the Boycott effect (Lamella clarifier). On the other hand, there is strong evidence that applying an electric field across a colloidal suspension can destabilize the mixture and facilitate settling behavior of particles through electrocoagulation. There are a multitude of parameters affecting the settling rate of particles such as particle size, shape, density, conductivity, and concentration, liquid density and viscosity, duct angle and width, electric field strength, conductivity, effective area, and spacing of electrode plates, etc. As a result, full control on settling may optionally employ data analysis through Machine Learning (ML) and Artificial Intelligence (AI) for the purpose of training, controlling, diagnosing, and optimizing the system operation. An aim of this description is to design a device incorporating the effects of adjustable plate inclination angle and adjustable plate spacing width (between adjacent plates), optional electrocoagulation, and optional AI. This novel hybrid adjustable separation system of this description will serve as the next generation of industrial particle settlers which will afford flexibility to various industrial processes, thereby improving efficiency and lowering environmental damage and operation cost. This adjustable separation system may be used in industrial processes such as microbe (algae, yeast, and/or bacteria) separation, fine (or other) particle separation in bio-based processing, inorganic and organic material separation and crude oil processing. This adjustable separation system can also be used in industries such as the polymer industry, the biorefinery industry, the food processing industry, etc. The system may operate in inline, semi-batch or continuous separation (over an extended period at industrial scale) modes.

The separation system may also provide a separation solution for corn ethanol processing plants in order to, for example, examine and improve the fluids, which will save money, time, and improve the overall quality of several industrial operations. The separation system may provide an energy efficient, swift, and affordable alternative to conventional energy intensive inline centrifugal concentrators which are currently used in these types of operations.

The particles in the liquid that can be separated from the liquid may be from 1 nm in size to 100 μm or larger.

The temperature range (i.e., within the enclosure that houses the plate electrodes) during separation may be, for example, 0-200° C. or higher. Thus, the separation may occur during complementary processes such as boiling, distillation, chromatography, etc.

Although the present disclosure is discussed with respect to solid-liquid separation (i.e., where the particles are in liquid form), liquid-liquid separation may be contemplated using the adjustable separation system disclosed herein. For example, separation of oil and solids simultaneously (e.g., from thin stillage) may be envisioned. This applies to technology when the inventors lyse the algae in water suspension and separate oil and cell membrane from water. Alternatively, in another example, separation of oil from water may be envisioned. The oil may separate from the water using the Boycott effect via a difference in, for example, oil/water density or viscosity, or via a difference in oil/water electrical properties when optional electrocoagulation is employed. Oil, in this case, functions like a "particle" mentioned elsewhere in this disclosure. In other words, a particle may be considered any material to be separated from the remaining fluid via the Boycott effect and optional electrocoagulation. It is noted that an oil/water mixture in the form of an emulsion cannot be separated by mechanical methods, i.e. Boycott effect, and therefore electrocoagulation (or other another destabilizing technique) must be implemented. An non-homogeneous oil/water mixture may be separated by an inclined-plate electrode mechanism as long as, for example, one phase has less density (i.e., is buoyant).

ML component(s) (as a form of AI) may optionally be employed which would automatically adjust all the parameters to train, control, optimize, or diagnose separation without operator manual modification.

Although the plate electrodes may be separated with no intermediary element positioned in the spaces between the plate electrodes (as in Jiang et al.), non-conductive elements may be positioned in the spaces such as acrylic plates, for supporting the plate electrodes. The acrylic plates may be placed within the spaces after the plate electrode spacing and/or angle adjustments have been made, or may be placed within the spaces before or during the plate electrode spacing and/or angle adjustments. The acrylic plates may be connected to the plate electrodes so that, upon adjustment of the plate electrodes' angle and spacing, the acrylic plates move in a corresponding manner.

The particle-laden suspension is fed from at or near a top-side of the housing where the suspension hits an optional stopper plate which redirects the suspension downward through a distribution channel towards the housing bottom and then the suspension travels towards the housing top. This is an optional configuration, detailed functional design can vary based on different applications. For example, if possible, the inlet may alternatively be located at a lower portion of the housing which may eliminate the need for the optional stopper. The particles (e.g., sediments) within the suspension travel downward along the plate electrodes using the Boycott effect and are then collected from the bottom of the housing throughout a particle outlet where the sediment discharge occurs. Fluid without the particles (i.e., the resulting liquid subsequent the particle separation therefrom) exits the housing from near or at the top of the housing.

FIG. 1, by way of example only, is a diagram illustrating a schematic of an exemplary adjustable separation system 100 (i.e., without electrocoagulation), in accordance with an embodiment.

Figure 2:
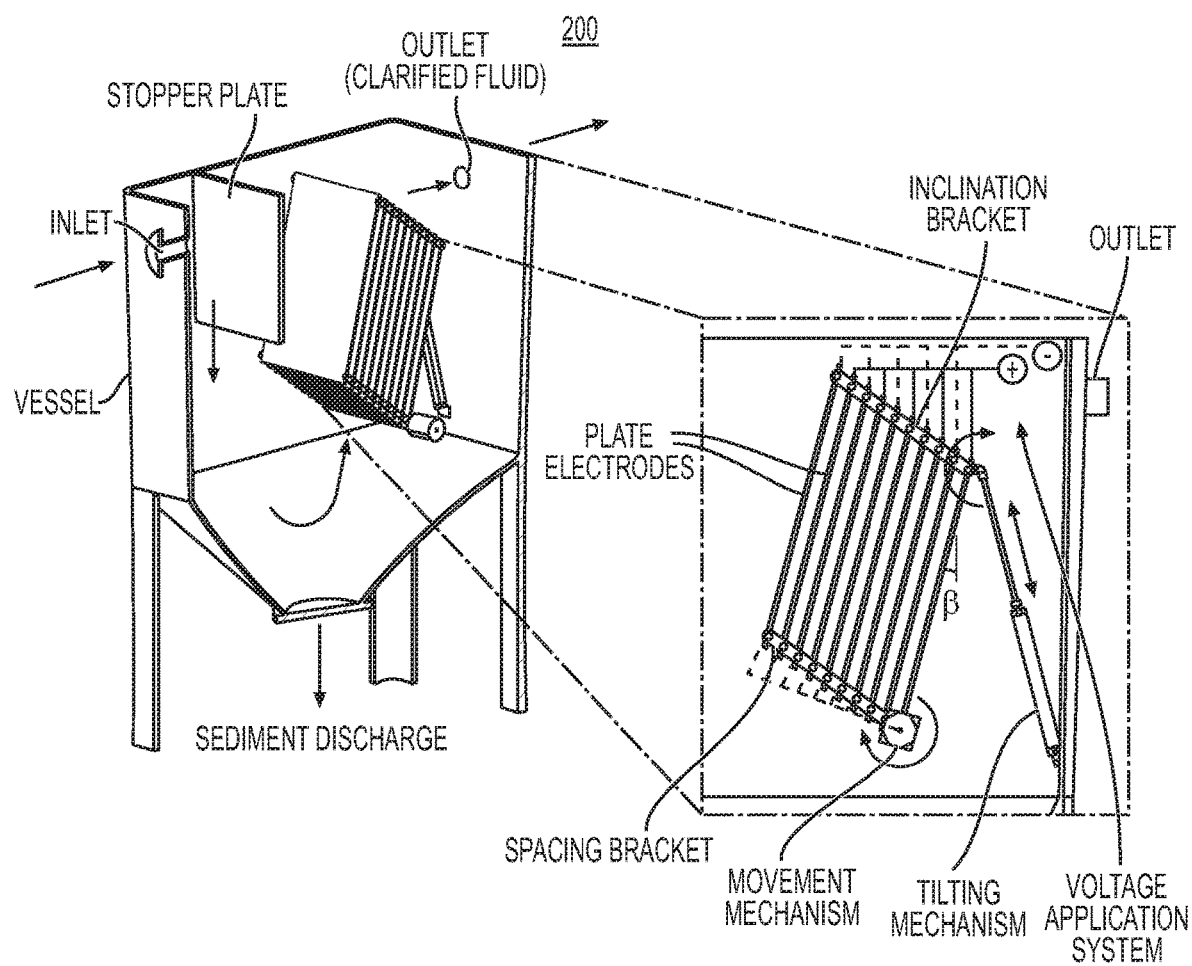
FIG. 2 is a diagram illustrating a schematic of the exemplary adjustable separation system of FIG. 1 with the addition of electrocoagulation, in accordance with an embodiment.

FIG. 2, by way of example only, is a diagram illustrating a schematic of the exemplary adjustable separation system 200 of FIG. 1 with the addition of electrocoagulation, in accordance with an embodiment.

Figure 3:
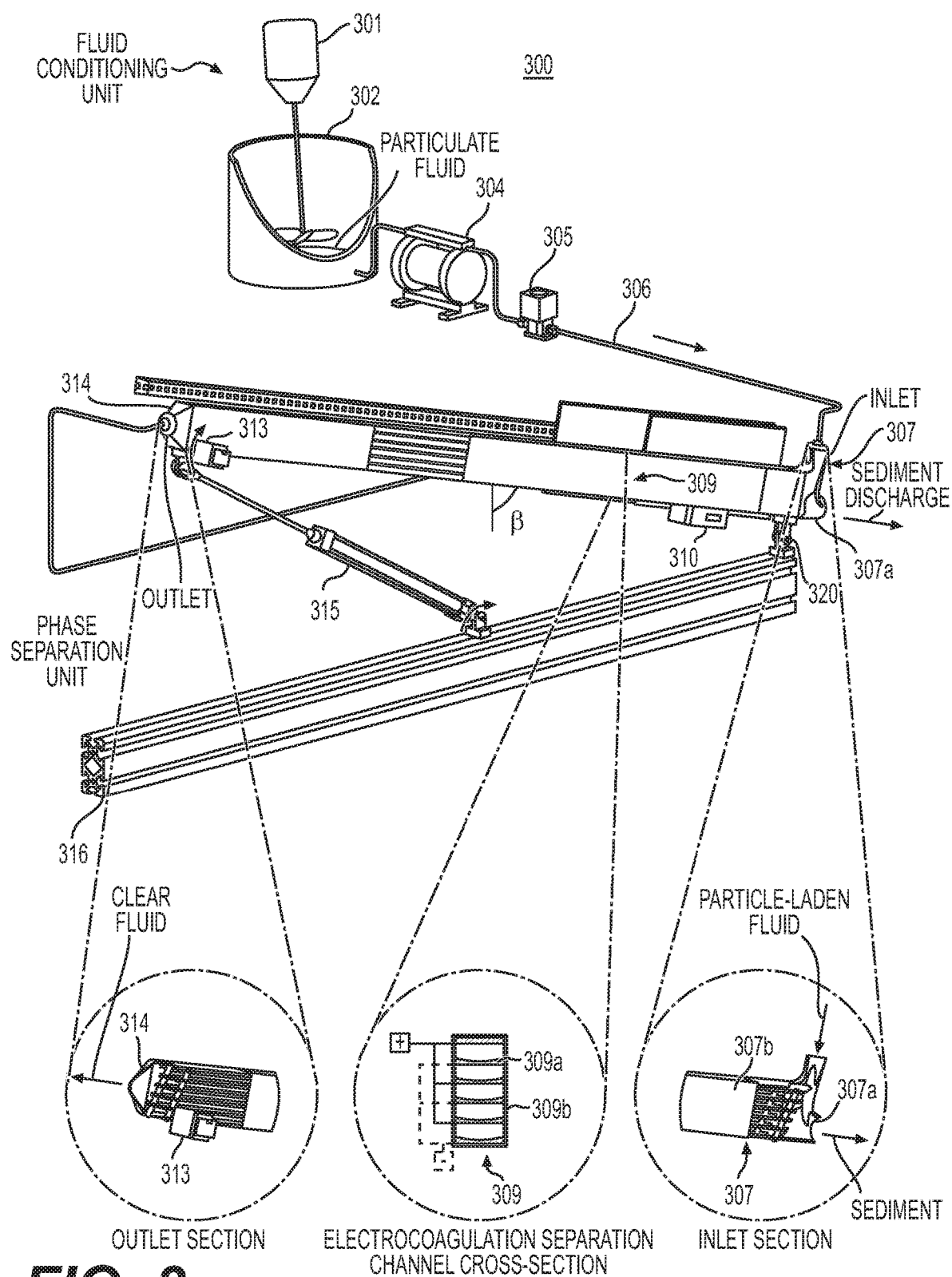
FIG. 3 is a diagram illustrating a schematic of an exemplary adjustable separation system with electrocoagulation, in accordance with an embodiment.

FIG. 3, by way of example only, is a diagram illustrating a schematic of an exemplary adjustable separation system 300 with electrocoagulation, in accordance with an embodiment. FIG. 3 includes the following elements and associated reference numbers:

mixer 301 particle-laden liquid/fluid reservoir 302 diaphragm pump 304 solenoid valve 305 connecting tube 306 inlet manifold 307 includes:

manifold 307a; and expandable sliding sleeve 307b (used for providing extra length as a result of using the gap adjusting mechanism mentioned below)

electrocoagulation separation channel 309 (e.g. approx. 2 meters in length) includes:

plate electrodes 309a; and acrylic ducts/plates (two sides) 309b pivot 320
digital angle indicator (or sensor) 310
stepper motor (gap adjusting mechanism) 313
outlet connector 314
tie-rod pneumatic cylinder assembly 315
frame 316 (e.g. aluminum)

In FIG. 3, the electrocoagulation separation channel 309 (and included plate electrodes 309a) is capable of incline adjustment by way of Tie-Rod Pneumatic Cylinder Assembly 315 operatively connected to rigid frame 316. The electrocoagulation separation channel 309 is partially supported by and pivotable about pivot 320. Particle-laden fluid enters the inlet. As a result of the Boycott effect (and optional electrocoagulation), the sediment/particles exit the electrocoagulation separation channel 309 via manifold 307a (adjacent the inlet), while the clear (i.e., particle-less) fluid exits the electrocoagulation separation channel 309 via outlet connector 314. The plate electrodes 309a are sandwiched between acrylic ducts/plates 309b (which may be transparent) for support. The particle-laden fluid is shown being conditioned via a fluid conditioning unit which is optional. An adjustable spacing system of the type employed in the embodiment of FIG. 1 or 2 may be employed in the system of FIG. 3.

Figure 4:
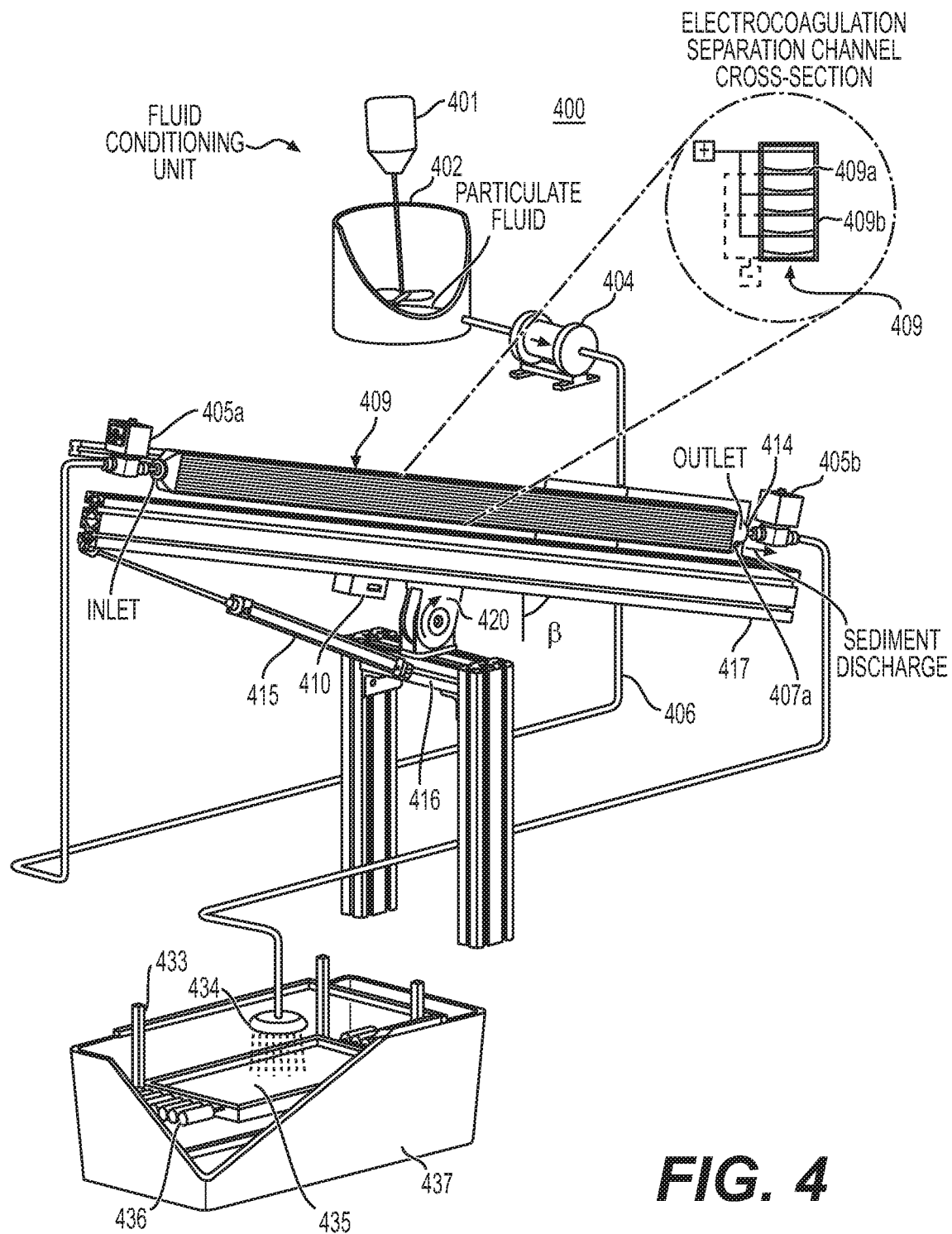
FIG. 4 is a diagram illustrating a schematic of an exemplary adjustable separation system with electrocoagulation, in accordance with an embodiment.

FIG. 4, by way of example only, is a diagram illustrating a schematic of an exemplary adjustable separation system 400 with electrocoagulation, in accordance with an embodiment. FIG. 4 includes the following elements and associated reference numbers:
mixer 401
particle-laden liquid/fluid reservoir 402
diaphragm pump 404
connecting tube 406
solenoid valves 405a, 405b
manifold 407a
electrocoagulation separation channel 409 (e.g. approx. 2 meters in length) includes:
    plate electrodes 409a; and
    acrylic ducts/plates (two sides) 409b
frame 416 (e.g. aluminum)
support beam 417
pivot 420
digital angle indicator (or sensor) 410
outlet connector 414
tie-rod pneumatic cylinder assembly 415
vertical guides 433 (e.g. aluminum)
nozzle 434
wire cloth panel 435 (e.g. stainless steel)
floats 436
container 437

In FIG. 4, the electrocoagulation separation channel 409 (and included plate electrodes 409a) is capable of incline adjustment by way of tie-rod pneumatic cylinder assembly 415 operatively connected between rigid frame 416 and support beam 417. The electrocoagulation separation channel 409 is supported via the support beam 417. The support beam 417 is partially supported by, and pivotable about, pivot 420. Particle-laden fluid enters the inlet. As a result of the Boycott effect (and optional electrocoagulation), the sediment/particles exit the electrocoagulation separation channel 409 via a manifold 407a (adjacent the outlet). The resultant fluid (i.e., without the sediment that has exited via manifold 407a) exits the electrocoagulation separation channel 309 via outlet connector 414 and is optionally sent to a filtration unit (including vertical guides 433, nozzle 434, wire cloth panel 435, floats 436, and container 437) for further filtration. The plate electrodes 409a are sandwiched between acrylic ducts/plates 409b (which may be transparent) for support. The particle-laden fluid is shown being conditioned via a fluid conditioning unit which is optional. An adjustable spacing system of the type employed in the embodiment of FIG. 1 or 2 may be employed in the system of FIG. 4. In this or any embodiment of this description, the plate electrodes can be perforated so that fluids or particles easily travel across plates to enhance separation. For example, without considering such accommodation, collecting particles from manifold 407a is impossible. Some applications of perforated plates are as follows: enhancing the flow of clarified liquid; facilitating the precipitation of separated particles; and/or sorting particles based on different sizes or shapes. Also, in any embodiment of this description, the plate electrodes may be consumable (i.e., dissolvable, reactive, or non-inert, such as aluminum or iron plate electrodes. Or, the plate electrodes can be inconsumable (i.e., permanent, non-reactive, inert, such as graphite, stainless steel, or nickel plate electrodes.

FIGS. 3 and 4 depict intelligent hybrid industrial particle settlers (i.e., exemplary separation systems) combining the effects of electrocoagulation, Boycott flow, and, optionally, AI. With AI, the separation system may be partially or fully automated and may be used for a variety of suspension solutions without the need for manual/technician adjustments. As mentioned in the Background section above, the current settler designs are fixed (i.e., no adjustable plates' spacing, angle or electric field variation). As a result, the current settling process is highly inefficient and time/energy consuming. The adjustable/intelligent design of this description overcomes those barriers at a much lower cost. The discussion of FIGS. 3 and 4 may be applicable to the adjustable separation systems in FIG. 1 or 2, with the exception of the use of electrocoagulation which is not employed in the embodiment of FIG. 1. Likewise, features of FIGS. 1 and 2 may be applicable to the adjustable separation systems in FIG. 3 or 4.

Embodiments are directed to an adjustable separation system for separating particles suspended in a liquid. The adjustable separation system comprises an adjustable particle separation channel comprising: a plurality of plate electrodes; and an adjustable inclination system configured to adjust inclination of the plate electrodes through a range of angles, or an adjustable spacing system configured to adjust spacing between adjacent plate electrodes. The adjustable separation system is configured to allow the particle-laden liquid to traverse the plate electrodes within the separation channel, thereby separating the particles from the liquid while using Boycott effect.

In an embodiment, the adjustable particle separation channel comprises the adjustable inclination system.

In an embodiment, the range of angles β is from 0.1°-89.9° with respect to the vertical axis.

In an embodiment, the adjustable inclination system comprises an inclination bracket operatively connected to the plate electrodes, whereby movement of the inclination bracket adjusts the inclination of the plate electrodes through the range of angles.

In an embodiment, the adjustable inclination system further comprises a tilting mechanism operatively connected to the inclination bracket, wherein the tilting mechanism effects the movement of the inclination bracket. The movement of the inclination bracket may be performed via a tilting mechanism such as a tilting cylinder assembly (which may be connected to a wall of the housing/vessel) that operatively connects to the inclination bracket thereby moving the inclination bracket as shown in FIGS. 1 and 2. The tilting cylinder may be pneumatically driven. Alternatively, other types of tilting mechanisms may be employed with or without the tilting cylinder such as the pivots 320, 420 as shown in FIGS. 3 and 4, respectively, or one that operates similar to a venetian blind assembly (in terms of the tilting/ angling adjustability of the blinds). Pins may be utilized to movably connect the plate electrodes to the inclination bracket. It is noted that the systems of FIGS. 1-4 all employ a tilting cylinder-pivot mechanism. However, in FIGS. 1 and 2, the plate electrodes themselves are tilted. Whereas, in FIGS. 3 and 4, the entire channel housing the plate electrodes is inclined.

In an embodiment, the adjustable particle separation channel comprises the adjustable spacing system.

In an embodiment, the adjustable spacing system comprises a spacing bracket operatively connected to the plate electrodes, whereby movement of the spacing bracket adjusts the spacing between the adjacent plate electrodes.

In an embodiment, the adjustable spacing system further comprises a movement mechanism operatively connected to the spacing bracket, wherein the movement mechanism effects the movement of the spacing bracket. The movement of the spacing bracket may be performed via a movement mechanism such as a motor (of, for example, stepper type and which may be connected to a wall of the housing/vessel) that operatively connects to the spacing bracket thereby moving the spacing bracket as shown via phantom lines in FIGS. 1 and 2. The spacing bracket functions as a rotating arm mechanism connected to one end of all the plate electrodes resulting in a shearing effect on the plate electrodes, thereby adjusting the spacing between them. Other types of movement mechanisms may be employed, such as one that operates similar to a venetian blind assembly (in terms of the spacing adjustability between adjacent blinds). Pins may be utilized to movably connect the plate electrodes to the spacing bracket.

In an embodiment, the separation channel is an electrocoagulation separation channel, whereby the plate electrodes are configured to be alternately voltage-biased using a voltage application system. The separation of the particles from the liquid uses a combination of electrocoagulation and the Boycott effect.

In an embodiment, the particles comprise solid material.

Embodiments are also directed to a method of using an adjustable separation system for separating particles suspended in a liquid. The method comprises: providing an adjustable particle separation channel comprising a plurality of plate electrodes, wherein the adjustable particle separation channel is part of the adjustable separation system; adjusting inclination of the plate electrodes through a range of angles using an adjustable inclination system, or adjusting spacing between adjacent plate electrodes using an adjustable spacing system; and allowing the particle-laden liquid to traverse the plate electrodes within the separation channel, thereby separating the particles from the liquid while using Boycott effect.

In an embodiment of the method, the adjustable particle separation channel comprises the adjustable inclination system, the method comprising the step of adjusting inclination.

In an embodiment of the method, the range of angles β is from 0.1°-89.9° with respect to the vertical axis.

In an embodiment of the method, the adjustable inclination system comprises an inclination bracket operatively connected to the plate electrodes, wherein the adjusting the inclination of the plate electrodes through the range of angles is performed via moving the inclination bracket.

In an embodiment of the method, the adjustable inclination system further comprises a tilting mechanism operatively connected to the inclination bracket, wherein the tilting mechanism effects the movement of the inclination bracket. The movement of the inclination bracket may be performed via a tilting mechanism such as a tilting cylinder assembly (which may be connected to a wall of the housing/vessel) that operatively connects to the inclination bracket thereby moving the inclination bracket as shown in FIGS. 1 and 2. The tilting cylinder may be pneumatically driven. Alternatively, other types of tilting mechanisms may be employed with or without the tilting cylinder such as the pivots 320, 420 as shown in FIGS. 3 and 4, respectively, or one that operates similar to a venetian blind assembly (in terms of the tilting/angling adjustability of the blinds). Pins may be utilized to movably connect the plate electrodes to the inclination bracket.

In an embodiment of the method, the adjustable particle separation channel comprises the adjustable spacing system, the method comprising the step of adjusting spacing.

In an embodiment of the method, the adjustable spacing system comprises a spacing bracket operatively connected to the plate electrodes, wherein the adjusting the spacing between adjacent plate electrodes is performed via moving the spacing bracket.

In an embodiment of the method, the adjustable spacing system further comprises a movement mechanism operatively connected to the spacing bracket, wherein the movement mechanism effects the movement of the spacing bracket. The movement of the spacing bracket may be performed via a movement mechanism such as a motor (of, for example, stepper type and which may be connected to a wall of the housing/vessel) that operatively connects to the spacing bracket thereby moving the spacing bracket as shown via phantom lines in FIGS. 1 and 2. The spacing bracket functions as a rotating arm mechanism connected to one end of all the plate electrodes resulting in a shearing effect on the plate electrodes, thereby adjusting the spacing between them. Other types of movement mechanisms may be employed, such as one that operates similar to a venetian blind assembly (in terms of the spacing adjustability between adjacent blinds). Pins may be utilized to movably connect the plate electrodes to the spacing bracket.

In an embodiment of the method, the separation channel is an electrocoagulation separation channel, wherein the method further comprises applying an alternately voltage-biasing to the plate electrodes using a voltage application system. The separation of the particles from the liquid uses a combination of electrocoagulation and the Boycott effect.

In an embodiment of the method, the particles comprise solid material.

The method steps in any of the embodiments described herein are not restricted to being performed in any particular order. Also, structures mentioned in any of the method embodiments may utilize structures mentioned in any of the device embodiments. Such structures may be described in detail with respect to the device embodiments only but are applicable to any of the method embodiments.

Features in any of the embodiments described above may be employed in combination with features in other embodiments described above, such combinations are considered to be within the spirit and scope of the present invention.

The contemplated modifications and variations specifically mentioned above are considered to be within the spirit and scope of the present invention.

It's understood that the above description is intended to be illustrative, and not restrictive. The material has been presented to enable any person skilled in the art to make and use the concepts described herein, and is provided in the context of particular embodiments, variations of which will be readily apparent to those skilled in the art (e.g., some of the disclosed embodiments may be used in combination with each other). Many other embodiments will be apparent to those of skill in the art upon reviewing the above description. The scope of the embodiments herein therefore should be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. An adjustable separation system for separating particles suspended in a liquid, the adjustable separation system comprising:
    an adjustable particle separation channel comprising:
        a plurality of plate electrodes; and
        an adjustable spacing system configured to adjust spacing between adjacent plate electrodes;
    wherein the adjustable separation system is configured to allow the particle-laden liquid to traverse the plate electrodes within the separation channel, thereby separating the particles from the liquid while using Boycott effect.

2. The adjustable separation system of claim 1, wherein the adjustable spacing system comprises a spacing bracket operatively connected to the plate electrodes, whereby movement of the spacing bracket adjusts the spacing between the adjacent plate electrodes.

3. The adjustable separation system of claim 2, wherein the adjustable spacing system further comprises a movement mechanism operatively connected to the spacing bracket, and wherein the movement mechanism effects the movement of the spacing bracket.

4. The adjustable separation system of claim 1, wherein the separation channel is an electrocoagulation separation channel, whereby the plate electrodes are configured to be alternately voltage-biased using a voltage application system, and wherein the separation of the particles from the liquid uses a combination of electrocoagulation and the Boycott effect.

5. The adjustable separation system of claim 1, wherein the particles comprise solid material.

6. A method of using an adjustable separation system for separating particles suspended in a liquid, the method comprising:
    providing an adjustable particle separation channel comprising a plurality of plate electrodes, wherein the adjustable particle separation channel is part of the adjustable separation system;
    adjusting spacing between adjacent plate electrodes using an adjustable spacing system, wherein the adjustable particle separation channel further comprises the adjustable spacing system; and
    allowing the particle-laden liquid to traverse the plate electrodes within the separation channel, thereby separating the particles from the liquid while using Boycott effect.

7. The method of claim 6, wherein the adjustable spacing system comprises a spacing bracket operatively connected to the plate electrodes, and wherein the adjusting the spacing between adjacent plate electrodes is performed via moving the spacing bracket.

8. The method of claim 7, wherein the adjustable spacing system further comprises a movement mechanism operatively connected to the spacing bracket, and wherein the movement mechanism effects the movement of the spacing bracket.

9. The method of claim 6, wherein the separation channel is an electrocoagulation separation channel, wherein the method further comprises applying an alternately voltage-biasing to the plate electrodes using a voltage application system, and wherein the separation of the particles from the liquid uses a combination of electrocoagulation and the Boycott effect.

10. The method of claim 6, wherein the particles comprise solid material.

* * * * *